Patented Aug. 31, 1954

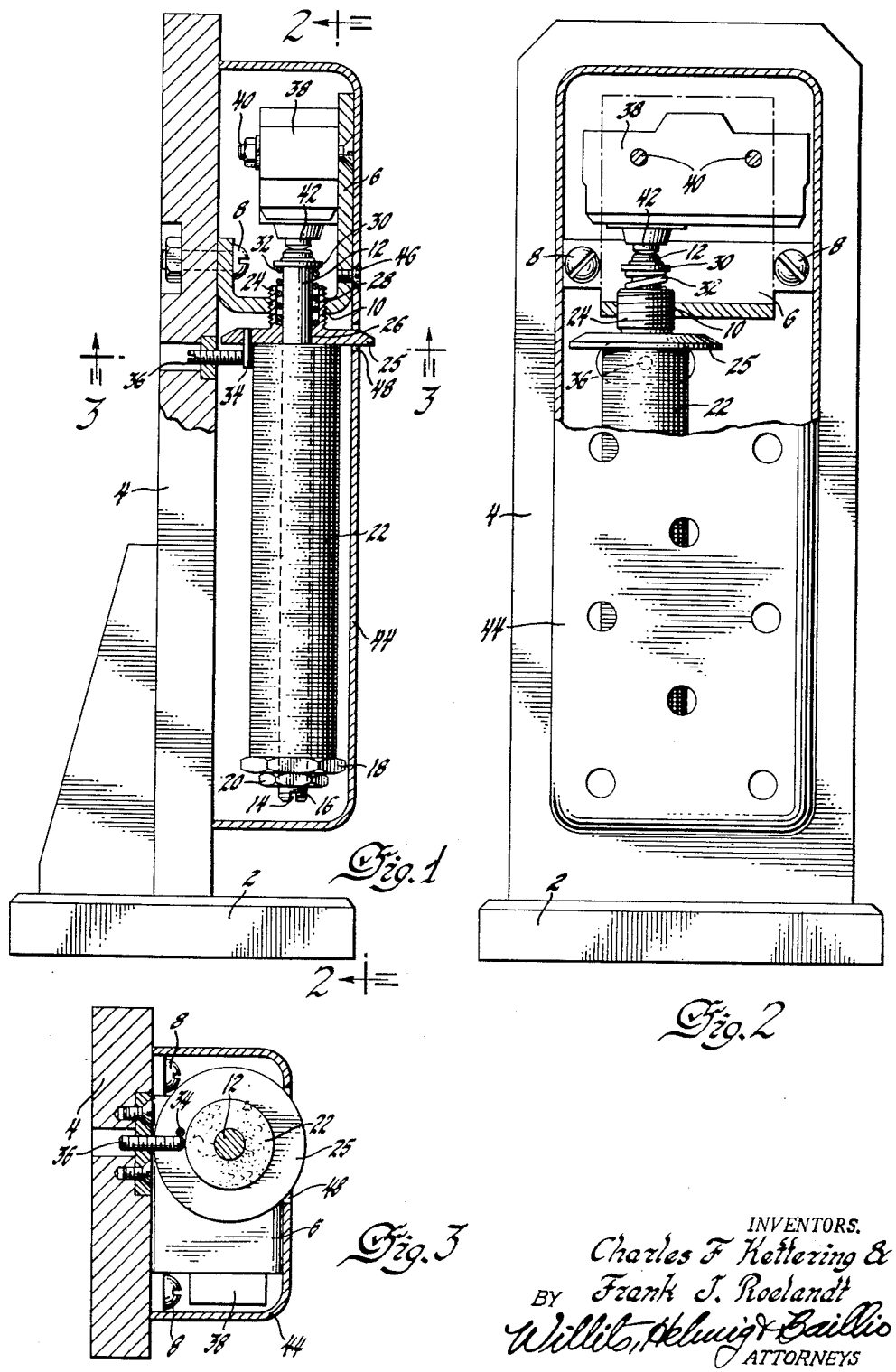

2,688,056

UNITED STATES PATENT OFFICE 2,688,056

HUMIDISTAT

Charles F. Kettering and Frank J. Roselandt, Detroit, Mich., assignors to General Motors Corporation, Detroit, Mich., a corporation of Delaware Application October 24, 1951, Serial No. 252,902

8 Claims. (Cl. 200—61.06)

1

This invention relates to a control means which is responsive to humidity changes and which is used to control apparatus for maintaining the moisture content of air at a given predetermined amount within a prescribed enclosure.

It is an object of the invention to provide a new and novel hygrostat to maintain constant a desired humidity.

It is a further object of the invention to provide a simple and rugged humidity sensitive control device.

With these and other objects in view which will become apparent as the specification proceeds the invention will be best understood by reference to the following specification and claims and the illustrations in the accompanying drawings, in which:

Figure 1 is a side elevational view of a device made in accordance with the invention, parts being broken away and shown in section.

Figure 2 is a sectional view taken on the line 2—2 of Figure 1.

Figure 3 is a sectional view taken on the line 3—3 of Figure 1.

Figure 4:
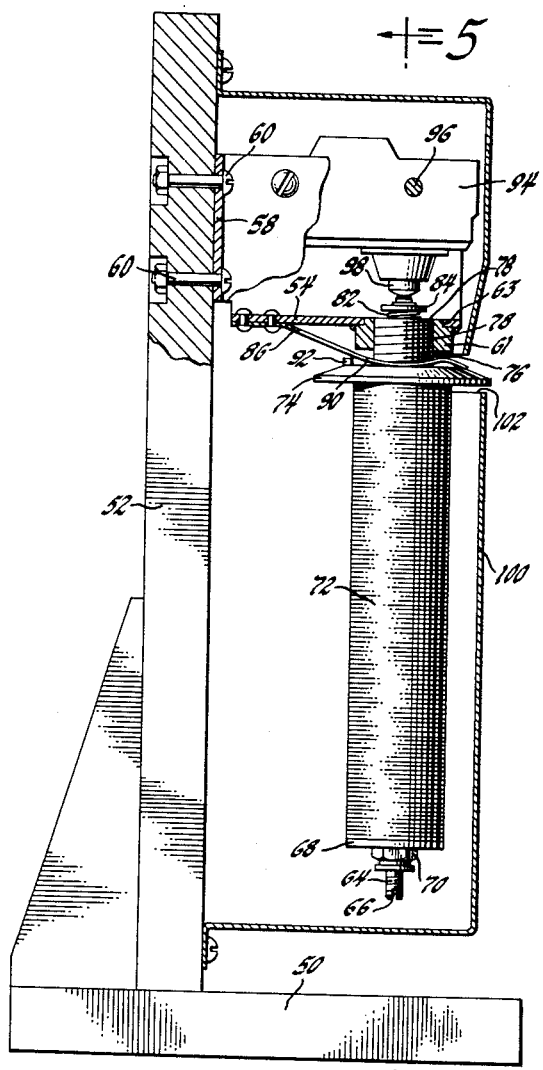
Figure 4 is a side elevational view of a modified form of the invention, parts being broken away and shown in section.

Referring now more particularly to the form of invention shown in Figures 1, 2 and 3, there is shown a base 2 to which is rigidly secured an upright member 4. On one side of the upright member 4 there is mounted an angled bracket 6 of U-shape, one leg being secured to the member 4 by bolts 8. A threaded opening 10 is provided in the lower portion of the U-shaped bracket 6.

A humidity sensitive assembly is provided to be threaded into the opening 10 and to be supported by the bracket 6. This assembly consists of a shaft 12, the lower end of which is slotted at 14 and the end adjacent thereto is threaded as at 16. A nut 18 is threaded onto the shaft 12 and a jam or lock nut 20 of smaller size is also threaded onto the end of the shaft to lock the first-mentioned nut 18 in a given position thereon. A series or elongated stack of paper discs 22 is carried by the body of the shaft 12, the nut 18 acting as a limit stop or bearing at one end to maintain the stack on the shaft. An exteriorly threaded flanged bushing 24 is provided on the other end within which the shaft slides, the flange 25 acting as a contact or bearing surface for the other end of the stack to retain it in place. The flanged portion 25 of the bushing has an opening 26 therein

2 of the approximate size of the shaft but permits relative sliding action between the two parts. The main body of the bushing 24 has a larger bore 28 leaving a cylindrical space between the inner diameter of the bushing and the exterior surface of the shaft 12. A washer 30 is fixedly mounted adjacent the upper end of the shaft and this acts as a retainer bearing for one end of a coil spring 32 mounted around the upper end of the shaft and extending down into the bushing and forcing the same into engagement with the stack of paper discs. The primary axial pressure on the stack of discs depends upon the spring pressure applied and this can be adjusted by turning the shaft within the nut 18 by applying a screw driver to slot 14 after the lock nut 20 has been backed away. This changes the effective length of the shaft and therefore the force of the loading spring 32.

The humidity sensitive assembly just described is supported by the bracket 6 by threading the bushing 24 into the opening 10 after the desired initial spring loading has been applied to the paper stack. After the bushing 24 has been screwed into the threaded opening to a desired point, it is desirable to limit its rotary motion during normal use. A pin 34 is mounted in the flange portion 25 of the bushing and extends axially to engage a threaded stop 36 which is carried by the upright and can be screwed in to engage the pin 34. This prevents the assembly from making more than 360° of rotation. The edge of the flange 25 may be calibrated in relative humidity at which the device operates.

The longitudinal or axial movement of the shaft 12 which is caused by the expansion and contraction of the paper discs due to changes in the humidity of the surrounding air, is utilized to operate switching means to open or close a switch as the humidity falls below or rises above a value for which the device has been set. The switching means utilized is a quick snap-over make and break type requiring a very small movement to actuate the same. These switches may be purchased and are identified as microswitches because of the small movement necessary for operation. The housing 38 of the switch is mounted on the bracket 6 by suitable bolts 40 so that the operating plunger 42 of the switch is in alignment with the shaft 12 of the humidity sensitive section. A protective cover 44 surrounds the mechanism and is held in place by a screw 46, the edge of the flange 25 projecting through an opening 48 for adjustment.

The humidity sensitive means is first assembled by running the shaft 12 through the coil spring 32, then the bushing 24, next the stack of paper discs 22, and lastly threading on the nut 18 which is tightened to provide the desired load on the spring. This assembly is then screwed into the bracket 6 until the shaft 12 contacts the plunger 42 of the switch at a given ambient humidity as shown on the flange. If this is not correct, then the lock nut 16 is loosened and a screw driver applied to slot 14 and shaft 12 is turned until the switch operates at the humidity reading set on the flanged dial. The stop screw 36 is then driven in until the limit pin 34 contacts the same to prevent the flange 25 from turning more than 360°. Movement of the flange manually will vary the setting of humidity at which the switch operates.

Figure 5:
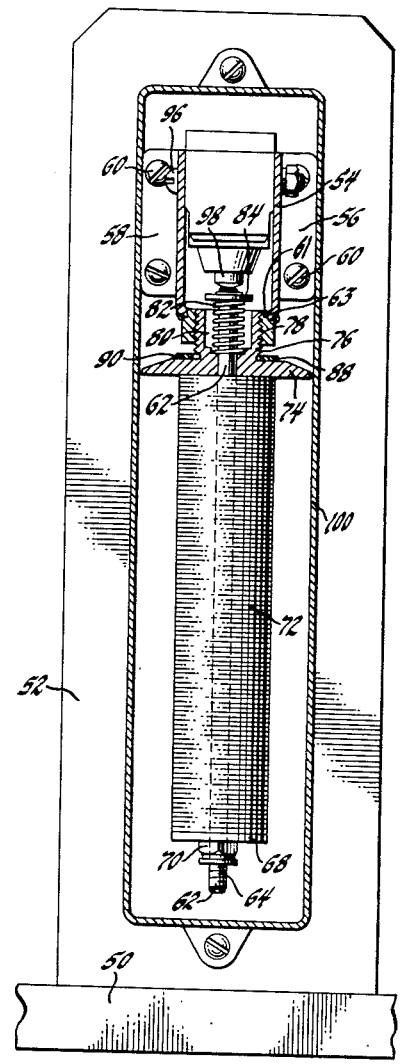
Figure 5 is a sectional view taken on the line 5—5 of Figure 4.

The modified form of invention shown in Figures 4 and 5 is generally the same as the first described form and consists of a stack of paper discs mounted in face-to-face relation which form a humidity sensitive element and which actuate switching means. In this form there is a base 50 to which is rigidly secured a vertical support 52. A U-shaped supporting bracket 54 has flanged ears 56 and 58 bolted to the face of the support 52 by bolts 60.

An internally threaded cylindrical member 61 is welded or otherwise secured in an opening 63 in the lower surface of the U-shaped support which is adapted to carry the humidity sensitive assembly. The latter consists of a central rod or shaft 62, the lower end of which is threaded at 64 and diametrically notched at 66. A retainer washer 68 is held on the shaft by nut 70 and holds a series of stacked paper discs 72. A flanged member 74 which is calibrated for a dial is slid on the shaft at the opposite end and acts as a bearing surface for the stack of paper discs. It has an axially extending portion 76 which is exteriorly threaded at 78 to screw into the opening in the member 61. This portion of the member is also counterbored to provide an opening 80 in which a spring 82 is mounted, one end of said spring bearing against the end of the counterbored section and the other against a washer 84 secured to the shaft 62. This spring loads the paper stack with a desired pressure which can be varied by adjusting the nut 70. This assembly is then mounted by threading portion 76 into member 61.

A strip spring member 86 has one end riveted to the lower surface of the U-shaped support 54 and is in the form of a yoke having arms 88 and 90 that fit around portion 76 to bear on the radial surface of the flanged member 74. A stop pin 92 in the flanged member engages this spring member and prevents the assembly from being rotated more than one turn.

A switch 94, of the quick snapover type known as microswitches which are operated by a small movement, is mounted on the U-shaped support by bolts 96. The movable actuating shaft 98 of the switch is in alignment with the shaft 62 of the humidity sensitive element. Any longitudinal movement of the shaft 62 will therefore move the actuating member 98 of the switch. A protective housing or casing 100 is mounted on the support 52 and has a slotted aperture 102 through which the edge of the flanged wheel 74 projects for adjustment purposes.

The humidity sensitive element is first assembled as a unit and approximately the proper compression is applied to the stack. This unit is then threaded into the bracket 54 until the shaft 62 engages the switch actuator 98 to throw the switch. If this is at the proper calibration on the flange 74 for the moisture content of the area, then the device is in working order. If it is not then the nut 70 is adjusted until with the dial set to the ambient humidity the switch is actuated. The device is now in proper condition. If it is desired to set the humidistat so that it will operate the switch at some other value of humidity, the dial 74 may be turned to the new value and the switch will then be actuated at that figure.

We claim:

1. In a hygrostat, a base, an element mounted for relative movement with respect to said base, a member associated with said element and adjustably mounted on said base, a stack of paper discs mounted on said element and bearing against the same and against the member, spring loading means to load the stack with a prescribed pressure, means for adjusting the spring loading means, adjustment of the adjustably mounted member moving the spring loaded stack as a whole with respect to the base for calibration purposes.

2. In a hygrostat, a base, an element mounted for relative movement with respect to said base, a member associated with said element and adjustably mounted on said base, a stack of paper discs mounted on said element and bearing against the same and against the member, spring loading means to load the stack with a prescribed pressure, means for adjusting the spring loading means, adjustment of the adjustably mounted member moving the spring loaded stack as a whole with respect to the base for calibration purposes, and switching means fixedly mounted on said base and engageable with the element to be actuated by movement of the same.

3. In a hygrostat, a support, an adjustably spring loaded humidity sensitive unit whose degree of movement may be varied by adjusting the spring, said unit being adjustably mounted as a whole on said support for calibration and switching means fixedly mounted on said support engageable with said unit to be operated by movement due to changes in humidity.

4. In a hygrostat, a humidity sensitive unit for actuating switching means comprising an operating element, two members mounted in spaced relation on said element, one fixed and the other relatively movable with respect thereto, a plurality of elements whose physical dimensions vary with a change in moisture content mounted on said operating element between the two members, spring biasing means secured to the operating element and applying force to the movable member to load the plurality of elements, means for adjusting the force of the spring biasing means, a support, and means for adjustably mounting said unit on said support.

5. In a hygrostat, a humidity sensitive unit for actuating switching means comprising, an operating member, two spaced parts mounted on said member, one fixed and one relatively movable with respect thereto, a stack of thin flat members whose dimensions change with variation in moisture content mounted on the operating member between the two parts, spring loading means on the operating member biasing the movable part toward the fixed part to load the stack of thin flat members, a support, means for adjustably mounting said unit on said support and switching means secured to said support engaging said operating member of the unit to be actuated thereby.

6. In a hygrostat, a humidity sensitive unit comprising a shaft, two spaced disc members mounted on said shaft, one fixed and one relatively movable with respect thereto, a stack of thin paper discs mounted on the shaft between the two spaced discs, spring biasing means on said shaft to force the movable disc toward the fixed to compress the stack of paper discs, a support, and means for adjustably mounting said unit on said support.

7. In a hygrostat, a humidity sensitive unit comprising a shaft, two spaced disc members mounted on said shaft, one fixed and one relatively movable with respect thereto, a stack of thin paper discs mounted on the shaft between the two spaced discs, said relatively movable disc having an axially extending exteriorly threaded counterbored portion, spring means mounted around said shaft within the counterbored portion and bearing against the shaft to load the stack of paper discs, a support having a threaded opening to receive the threaded portion of the movable disc to adjustably mount the unit thereon and switching means carried by said support engageable with the shaft for operation.

8. In a hygrostat, a humidity sensitive unit comprising a shaft, two spaced disc members mounted on said shaft, one fixed and one relatively movable with respect thereto, a stack of thin paper discs mounted on the shaft between the two spaced discs, said relatively movable disc having an axially extending exteriorly threaded counterbored portion, spring means mounted around said shaft within the counterbored portion and bearing against the shaft to load the stack of paper discs, a support having a threaded opening to receive the threaded portion of the movable disc to adjustably mount the unit thereon, switching means carried by said support engageable with the shaft for operation, and stop means on the support to limit the adjustable movement of the unit.

References Cited in the file of this patent

UNITED STATES PATENTS

| Number | Name | Date |
| --- | --- | --- |
| 1,675,302 | Roemer | June 26, 1928 |
| 1,894,842 | Appelberg | Jan. 17, 1933 |
| 2,041,658 | Hodge | May 19, 1936 |